Patented Oct. 3, 1939

2,175,096

UNITED STATES PATENT OFFICE 2,175,096

FLOOR AND WALL COVERING MATERIAL

Hugo Strauch, Krefeld-Uerdingen, Germany, assignor to I. G. Farbenindustrie Aktiengesellschaft, Frankfort-on-the-Main, Germany No Drawing. Application October 23, 1936, Serial No. 107,229. In Germany November 7, 1935

4 Claims. (Cl. 260—31)

This invention relates to a new composition of matter and the manufacture of the same. The process of manufacture according to the invention is by incorporating a filling material with an aqueous emulsion of a soft or liquid natural or artificial material which dries by autoxidation or polymerisation and/or a solution of a substance yielding a film on the evaporation of the solvent, using for the production of the emulsion an emulsifying agent which is soluble in both water and oil.

Among the products suitable as film forming viz. binding media in the process of this invention drying oils, such as linseed oil, tung oil, oiticica oil, sunflower oil, menhaden oil, perilla oil, poppy oil, especially also in the form of heat treated oil (stand oil) may be mentioned. Furthermore oil lacquers can be employed, such as for example, those obtainable by dissolving in drying oils natural resins, such as rosin or copals and esters thereof, or also artificial resins, such as cumarone resins or the alkyd resins resulting from the condensation of polyhydric alcohols, polybasic acids and monobasic carboxylic acids derived from drying oils.

In addition spirit lacquers can also find application, such as for example the lacquers obtainable by dissolving soft copal, candarac, elemi or mastic in spirit and also solutions of cellulose esters, cellulose ethers, polymerised vinyl esters and vinyl ethers, polymerised acrylic and methacrylic esters, polymerised and subsequently chlorinated vinyl chloride, chlorinated rubber or other film forming materials in appropriate volatile organic solvents, such as methyl propionate, ethyl acetate, butyl acetate, glycol monoacetate, ethyl glycol acetate, ethyl glycol butylether, cyclohexanone, mixtures of the solvents mentioned before with aliphatic or aromatic hydrocarbons, such as benzine, ligroine, benzene, toluene etc. Products of this kind which already inherently possess the requisite soft to liquid consistency, such as for example stand oils and alkyd resins of soft consistency can be used as such without a solvent. Among the substances enumerated those possessing air-drying properties on account of their content of radicles of fatty acids derived from drying oils, particularly however the air-drying alkyd resins are especially valuable for the purposes of the present invention.

The drying rate of the air-drying materials used in the performing of this invention can be increased by the addition of driers, such as for example the naphthenates, linoleates or resinates of lead, manganese or cobalt.

If solutions of cellulose derivatives or of certain polymerised vinyl compounds are used the addition of softeners is recommended, such as for example, tricresylphosphate, dibutyl phthalate, adipic acid esters and phthalic acid esters.

As fillers to be used in the process of this invention any powdered or ground solids of inorganic or organic origin insoluble in water as well as in the binding medium and inert to the action of air, water and light at ordinary temperatures are operative. Particularly adapted for the purposes of this invention are stone flour, gypsum, talcum, chalk, asbestos fibres, asbestos powder, kieselguhr, leather dust, saw dust and cork meal. The best results are obtained by mixing inorganic and organic fillers with one another. The fillers may be incorporated with pigments, such as ochre, yellow iron hydroxide, chromium hydroxide, titanium dioxide, zinc oxide and lithopone.

It is especially advisable to apply the mineral filler in such a condition that coarser and finer particles are mixed with one another. The size of the particles may differ advantageously between about 1,5 and 420$\mu$ and the average particle size may come to 30–40$\mu$.

The relative quantities of mineral and organic fillers can be varied. The higher the content of organic filler, such as for example sawdust, the better is the isolation power of the floor and wall coatings against heat and sound. It is to be recommended to use fillers consisting of about 15 to about 30 parts by weight of an organic filler besides 100 parts by weight of an inorganic filler.

Among the above indicated emulsifying agents which are soluble in both water and oil may be mentioned alkali metal sulfonates of polyalkylated aromatic hydrocarbons and particularly such as possess good solubility in oil, such as triethanolamine, the ammonium salts of the linseed oil fatty acids and oleic acid and especially the products obtainable by the action of ethylene oxide on hydroxyl derivatives of compounds possessing long aliphatic chains, for example octadecyl alcohol, particularly good results being obtained with the reaction products of ethylene oxide on castor oil.

The working up of the aqueous emulsion with the filling material proceeds by known methods, for example in a mixing drum provided with an agitator of shovel shape. It is particularly to be recommended to select the proportions in such a manner that a product results which is moist like wet earth but not sticky.

When the said products are to be applied for commercial purpose, for example in the production of a covering material for floors, the working up proceeds in such a manner that the product is spread in a uniform layer on a floor, which if desired has been previously given a coating with a lacquer. Thereupon the product is pressed down on the floor with an appropriate tool, for example, a roller or trowel. It depends on the nature of the starting material used and the quantity thereof employed as to what time must elapse before the coating can be trodden on or will be capable of being nailed; generally speaking this may be from 3–5 days.

The invention is illustrated by the following examples, but not restricted thereto; the parts are by weight:

Example 1

A solution of 70 parts by weight of an alkyd resin (obtained by the condensation of 270 parts by weight of linseed oil fatty acids, 92 parts by weight of glycerine and 170 parts by weight of phthalic acid anhydride) in 30 parts by weight of linseed oil and 25 parts by weight of white spirit is made into an emulsion after the addition of 3 parts by weight of lead manganese linoleate and 10 parts by weight of a wetting agent obtained by the action of ethylene oxide on castor oil, the amount of water used being 150–200 parts.

This emulsion is caused to run into a mixing appliance containing a mixture of 650 parts by weight of stone flour, 100 parts by weight of talcum, 50 parts by weight of chalk, 150 parts by weight of wood meal and 20 parts by weight of chromium oxide green, whereupon the mixture is kneaded intimately. A moist mass is obtained, which easily can be spread or brushed.

This powder is worked up into a floor covering in the following manner:

The floor, for example a stone floor, is given a preliminary brushing with a solution consisting of 70 parts by weight of cumarone resin in 10 parts by weight of linseed oil and 20–30 parts by weight of solvent naphtha. Then the powder is applied in a uniform layer and rolled down by means of a roller or pressed by means of a trowel and smoothed over. After some four days it is possible to walk on the covering.

Example 2

A solution of 100 parts by weight of the alkyd resin referred to in Example 1 in 25 parts by weight of white spirit or petrol is made into an emulsion after the addition of 4 parts by weight of lead manganese linoleate and 10 parts by weight of the emulsifying agent described in Example 1 in the presence of 150 parts of water. This emulsion is caused to run into an appropriate mixing appliance containing an intimate mixture of 440 parts by weight of stone flour, 30 parts by weight of red iron oxide and 90 parts by weight of wood meal. The further working up of the product is effected in the manner described in Example 1.

Example 3

A solution of 150 parts by weight of the alkyd resin mentioned in Example 1 in 70 parts by weight of solvent naphtha added with 3–4 parts by weight of lead linoleate and 3 parts by weight of zinc naphthenate is emulsified with about 160 parts of water containing 16–20 parts by weight of the wetting agent used in Example 1. The emulsion is worked up in a suitable mixing apparatus with 1000 parts by weight of a filler mixture being preferably wet with about 400 parts of water. The filler consists of 760 parts by weight of stone flour, 30 parts by weight of kieselguhr, 50 parts by weight of red iron oxide and 160 parts by weight of wood meal. In consequence to the addition of kieselguhr to the filling mass this can be smoothed over in a remarkably easy manner, a similar effect being obtained by adding soluble potato starch to the aqueous emulsion employed.

Example 4

The alkyd resin in Example 3 is replaced by a solution of 100 parts by weight of cumarone resin in a mixture of 40 parts by weight of linseed oil and 10 parts by weight of linseed oil wood oil-stand oil. The further working up of the product is effected in the manner described in Example 3.

Example 5

The alkyd resin in Example 3 is replaced by 150 parts by weight of a copal lacquer, being diluted with 35 parts by weight of turpentine oil. The copal lacquer contains advantageously 2 parts by weight of melted copal and 1 part by weight of a drying oil.

Example 6

The alkyd resin in Example 3 is replaced by a solution of 150 parts by weight of colophony glycerine ester in 70 parts by weight of solvent naphtha. The further working up is effected in the way described in Example 3.

I claim:

1. A floor and wall covering material comprising a filler consisting of from about 15 to about 30 parts by weight of an organic filler besides 100 parts by weight of an inorganic filler incorporated with an aqueous emulsion of a compound capable of drying by autoxidation and selected from the group consisting of a drying oil, stand oil, an alkyd resin of soft consistency comprising a radical of a fatty acid derived from a drying oil, and an oil lacquer, said emulsion comprising an emulsifying agent soluble both in water and in oil, the filler and the emulsion being employed in such a proportion that a product results which is moist like wet earth but not sticky.

2. A floor and wall covering material comprising a filler consisting from about 15 to about 30 parts by weight of an organic filler besides 100 parts by weight of an inorganic filler incorporated with an aqueous emulsion of a compound capable of drying by autoxidation and selected from the group consisting of a drying oil, stand oil, an alkyd resin of soft consistency comprising a radical of a fatty acid derived from a drying oil, and an oil lacquer, said material being incorporated with a dryer and said emulsion comprising an emulsifying agent soluble both in water and in oil, the filler and the emulsion being employed in such a proportion that a product results which is moist like wet earth but not sticky.

3. A floor and wall covering material comprising a mixture of 650 parts by weight of stone flour, 100 parts by weight of talcum, 50 parts by weight of chalk, 150 parts by weight of wood meal and 20 parts by weight of chromium oxide green incorporated with an aqueous emulsion of a solution of 70 parts by weight of an alkyd resin obtainable by the condensation of 270 parts by weight of linseed oil fatty acids, 92 parts by weight of glycerine, and 170 parts by weight of phthalic acid anhydride in 30 parts by weight of linseed oil and 25 parts by weight of white spirit, said solution being incorporated with 3 parts by weight of lead manganese linoleate and 10 parts by weight of a wetting agent obtained by the action of ethylene oxide on castor oil, said emulsion comprising 150 parts of water.

4. A floor and wall covering material comprising a mixture of 760 parts by weight of stone flour, 30 parts by weight of kieselguhr, 50 parts by weight of red iron oxide and 160 parts by weight of wood meal incorporated with an aqueous emulsion of a solution of 150 parts by weight of an alkyd resin obtainable by the condensation of 270 parts by weight of linseed oil fatty acids, 92 parts by weight of glycerine and 170 parts by weight of phthalic acid anhydride in 70 parts by weight of solvent naphtha, said solution being incorporated with 3 parts by weight of zinc naphthenate and 3 parts by weight of lead linoleate and said emulsion comprising 20 parts by weight of an emulsifying agent obtainable by the action of ethylene oxide on castor oil besides 160 parts of water.

HUGO STRAUCH.